(12) United States Patent
Morales et al.

(10) Patent No.: US 8,149,439 B2
(45) Date of Patent: Apr. 3, 2012

(54) METHOD AND SYSTEM FOR AGGREGATING PRINT JOBS

(75) Inventors: Javier A Morales, Irondequoit, NY (US); Michael E Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1281 days.

(21) Appl. No.: 11/831,181

(22) Filed: Jul. 31, 2007

(65) Prior Publication Data

US 2009/0033979 A1 Feb. 5, 2009

(51) Int. Cl.
*G06F 3/12* (2006.01)

(52) U.S. Cl. .......... 358/1.15; 358/1.1; 358/2.1; 358/1.9; 358/1.18; 707/999.107; 707/999.102; 715/246; 715/251; 715/253

(58) Field of Classification Search .......... 358/1.15, 358/1.18, 1.1, 2.1, 1.9; 707/999.107, 999.102; 715/246, 251, 253
See application file for complete search history.

(56) References Cited

U.S. PATENT DOCUMENTS

| | | | |
|---|---|---|---|
| 5,220,674 A | 6/1993 | Morgan et al. | |
| 5,615,015 A | 3/1997 | Krist et al. | |
| 5,760,755 A | 6/1998 | Engle | |
| 5,995,721 A | 11/1999 | Rourke et al. | |
| 6,462,756 B1 | 10/2002 | Hansen et al. | |
| 6,650,433 B1 | 11/2003 | Keane et al. | |
| 7,092,963 B2 | 8/2006 | Ryan et al. | |
| 7,133,149 B2 | 11/2006 | Keane et al. | |
| 7,187,465 B2 | 3/2007 | Keane et al. | |
| 7,812,997 B2 * | 10/2010 | Morales et al. | 358/1.18 |
| 2002/0078012 A1 * | 6/2002 | Ryan et al. | 707/1 |
| 2004/0008371 A1 * | 1/2004 | Keane et al. | 358/1.15 |
| 2009/0033977 A1 * | 2/2009 | Morales et al. | 358/1.15 |
| 2009/0033978 A1 * | 2/2009 | Morales | 358/1.15 |

* cited by examiner

*Primary Examiner* — Jacky X Zheng
(74) *Attorney, Agent, or Firm* — Luis M. Ortiz; Kermit D. Lopez; Kevin Soules

(57) ABSTRACT

There is provided a computer implemented method of automatically aggregating multiple print jobs. The method includes: storing, in memory, a first print job group complying with a first set of print job aggregation criteria and a second print job group complying with a second set of print job aggregation criteria. A print job is received and at least a part of the received print job is aggregated with the first print job group to form a first aggregated print job set if the received print job complies with the first set of print job aggregation criteria and one of a set of release criteria is met. At least a part of the received print job is aggregated with the second print job group to form a second aggregated print job set if the received print job complies with the second set of print job aggregation criteria and one of a set of release criteria is met. Each one of the first aggregated print job and the second aggregated print job sets is transmitted to one or more document processing resources for processing. In turn, a network client may be apprised of when one of the first, second and third print jobs has been processed with the one or more document processing resources.

10 Claims, 8 Drawing Sheets

METHOD AND SYSTEM FOR AGGREGATING PRINT JOBS

CROSS-REFERENCE TO RELATED APPLICATIONS

Cross-reference is made to U.S. patent application Ser. No. 11/830,904 that was filed on the same day as the present application by the same assignee with the same title, and to U.S. patent Ser. No. 11/830,980 that was filed on the same day as the present application by the same assignee with the same title.

BACKGROUND AND SUMMARY

The disclosed embodiments relate generally to a method for processing print jobs and, more particularly, to an approach in which a plurality of print jobs are sorted into two or more print groups, each group eventually being aggregated for submission to one or more print-related devices for processing.

Creation and production of printed documents often involves many production and finishing operations that are highly variable with each job. In general, the various operations can be grouped into three major phases: 1) creation of the document information, including prepress operations that render the document in a form suitable for printing, 2) printing of the information onto some form of media such as paper, and 3) finishing of the selected media into a completed document. These 3 major phases often have many sub-phases, and the entire process may vary from relatively simple to extremely complex.

U.S. Pat. No. 6,462,756 B1 to Hansen et al. discloses a system and method for managing production printing workflow. The system includes workflow management software for managing and facilitating the procedural stages of the workflow including job origination, job preparation, job submission and job fulfillment. The workflow management software provides an integrated object oriented interface which visually reflects and interacts with the workflow. The software further provides functionality for efficient page level modifications to documents at the job preparation stage. This functionality allows such modifications to be easily made to selected pages and visually verified by displaying visual representations of the modifications on visual representations of the pages.

U.S. Pat. No. 7,092,963 B2 to Ryan et al. discloses a print production and finishing system for electronic management and control of a wide range of finishing processes characterized by input from multiple production operations and equipment that, depending upon the job, might be variably applied to work pieces that themselves are highly variable between different jobs. The disclosed embodiments of the '963 patent are applicable to many operations where processes for production of work pieces are managed separately from processes for finishing and packaging of such work pieces.

The short print runs seen in digital printing are of particular concern for continuous feed printers capable of printing over 1,000 pages per minute. As print quantities drop, the digital front end of a continuous feed printer might encounter difficulties in processing enough print jobs to keep the print engine running continuously. This problem is not so much attributable to rasterization speed as it is to the overhead required to handle an unwieldy number of discreet files in a timely manner. To deal with this problem, it is conceivable that a print shop could process multiple unrelated jobs as a single job. While this approach may address performance issues, it can be problematic because the original jobs are no longer visible as entries in the workflow. Moreover, grouping unrelated jobs together can significantly increase the difficulty of generating individual outputs from the single job.

At least three related references, namely U.S. Pat. Nos. 6,650,433; 7,133,149; and 7,187,465 are concerned with aggregating print jobs. In one disclosed approach, jobs may be aggregated as follows:

The prepress aggregation module, a rules-based program, aggregates print jobs by scanning the Ordered Items table of the central database and searching for items (print jobs) that have the same printing requirements, e.g., the same delivery date, paper grade, and post press processing requirements. Scanning generally continues until enough print jobs have been located to fill a layout of a given size. The XML files corresponding to the selected print jobs are then pulled from the Document Table, converted to PostScript files and aggregated, as discussed above.

This approach appears to possess some of the same possible shortcomings as the above-discussed prior art approach in that original jobs do not appear to be visible as entries in the workflow.

The pertinent portions of all of the above-mentioned patents are hereby incorporated by reference.

In accordance with a first aspect with the disclosed embodiments there is disclosed a computer implemented method of automatically aggregating multiple print jobs, comprising: (A) storing a first print job group of one or more print jobs in memory, the one or more print jobs of the first print job group complying with a first set of print job aggregation criteria; (B) storing a second print job group of one or more print jobs in memory, the one or more print jobs of the second print job group complying with a second set of print job aggregation criteria; (C) receiving a print job; (D) aggregating at least a part of the received print job with the first print job group to form a first aggregated print job set if (1) the received print job complies with the first set of print job aggregation criteria and (2) one of a set of release criteria is met; (E) aggregating at least a part of the received print job with the second print job group to form a second aggregated print job set if (1) the received print job complies with the second set of print job aggregation criteria and (2) one of a set of release criteria is met; (F) transmitting one or both of the first aggregated print job set and the second aggregated print job set to one or more document processing resources for processing; and (G) apprising a network client, with a system manager, of when one of the first, second and third print jobs has been processed with the one or more document processing resources.

In accordance with a second aspect of the disclosed embodiments there is disclosed a computer implemented method of automatically aggregating multiple print jobs, comprising: (A) storing a first print job group in a first memory section, the first print job group including a first set of print jobs with each one of the first set of print jobs complying with a first print job aggregation criteria; (B) storing a second print job group in a second memory section, the second print job group including a second set of print jobs with each one of the second set of print jobs complying with a second print job aggregation criteria; (C) over a time interval, receiving a plurality of print jobs with each one of the plurality of print jobs complying with either the first print job aggregation criteria or the second print job aggregation criteria; (D) sorting the plurality of print jobs, over the time interval, so that each print job complying with the first print job aggregation criteria is stored in association with the first print job group, and each print job complying with the second print job aggregation criteria is stored in association with the second print job group; (E) if a first selected condition occurs, (1) aggregating the first set of print jobs to form a first aggregated print job set, (2) providing a first job ticket, including a set of processing related instructions for each print job in the first aggregated print job set, and (3) producing print output with the first aggregated print job set and the first job ticket; and (F) if a second selected condition occurs, (1) aggregating the second set of print jobs to form a second aggregated print job set, (2) providing a second job ticket, including a set of processing related instructions for each print job in the second aggregated print job set, and (3) producing print output with the second aggregated print job set and the second job ticket.

In accordance with a third aspect of the disclosed embodiments there is disclosed system for automatically aggregating multiple print jobs, comprising: a first print job group of one or more print jobs, the one or more print jobs of the first print job group complying with a first set of print job aggregation criteria; a second print job group of one or more print jobs, the one or more print jobs of the second print job group complying with a second set of print job aggregation criteria; a system manager for coordinating the flow of print jobs to one or more document processing resources; and a computer-readable storage medium comprising one or more programming instructions that, when executed, instruct the system manager to: receive a print job, aggregate at least a part of the received print job with the first print job group to form a first aggregated print job set if the received print job complies with the first set of print job aggregation criteria and one of a set of release criteria is met, aggregate at least a part of the received print job with the second print job group to form a second aggregated print job set if the received print job complies with the second set of print job aggregation criteria and one of a set of release criteria is met, transmit one of the first aggregated print job set and the second aggregated print job set to one or more of the document processing resources, apprise a network client, with a system manager, of when one of the first, second and third print jobs has been processed with the one or more document processing resources.

DESCRIPTION OF DISCLOSED EMBODIMENTS

Figure 1:
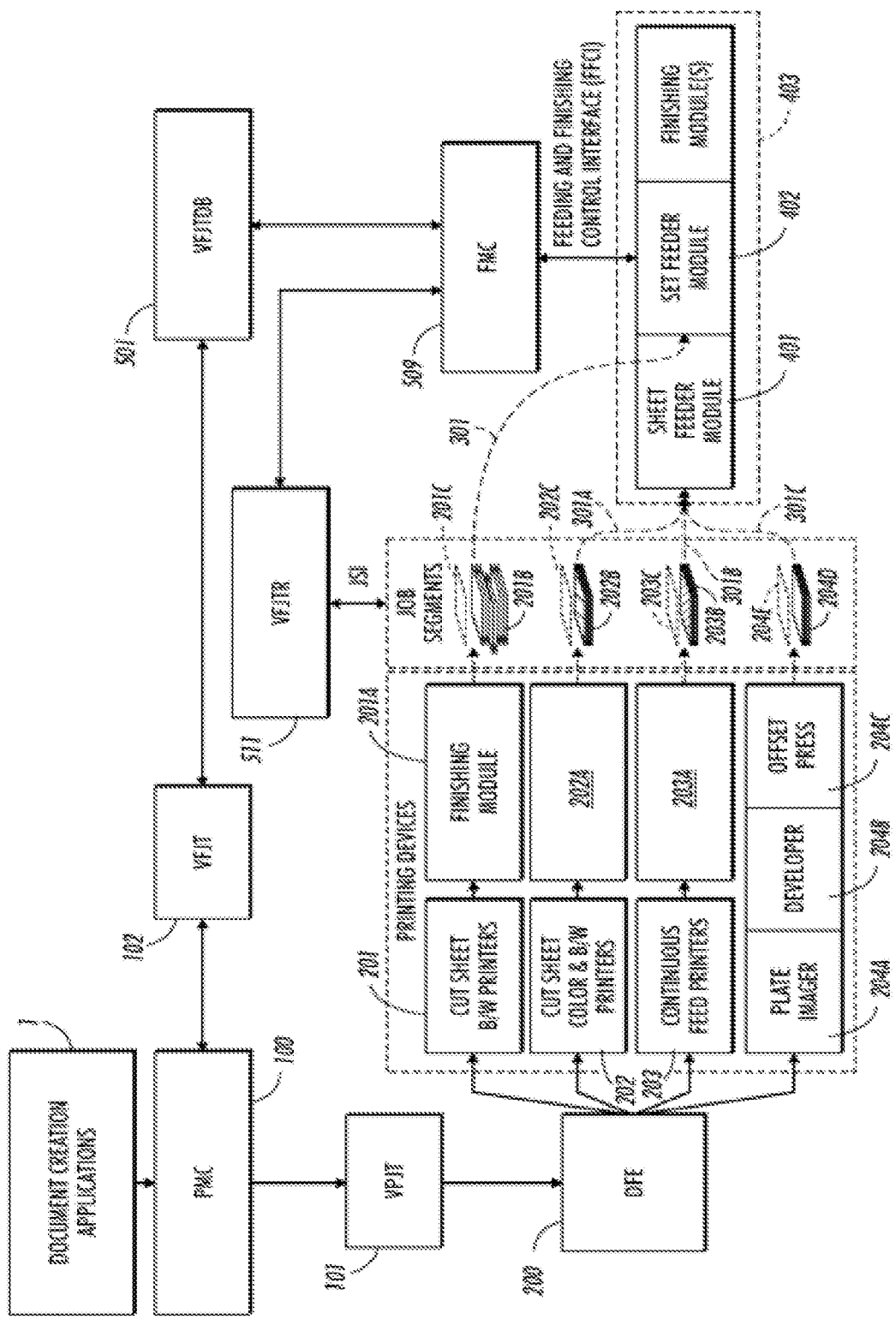
FIG. 1 is a block diagram of a document processing workflow including a production monitor controller (PMC), the workflow being suitably configured for use with the disclosed embodiments.

Turning now to FIG. 1, an overview of a workflow suitable for use with disclosed embodiments is shown. Within FIG. 1, box 1 represents prepress operations, and the output of the prepress operations of box 1 is a set of appropriate PDL files that are delivered to a Production Monitor Controller (PMC), 100. As described more fully below, the PMC is a controller that coordinates overall production of the print job.

Figure 2:
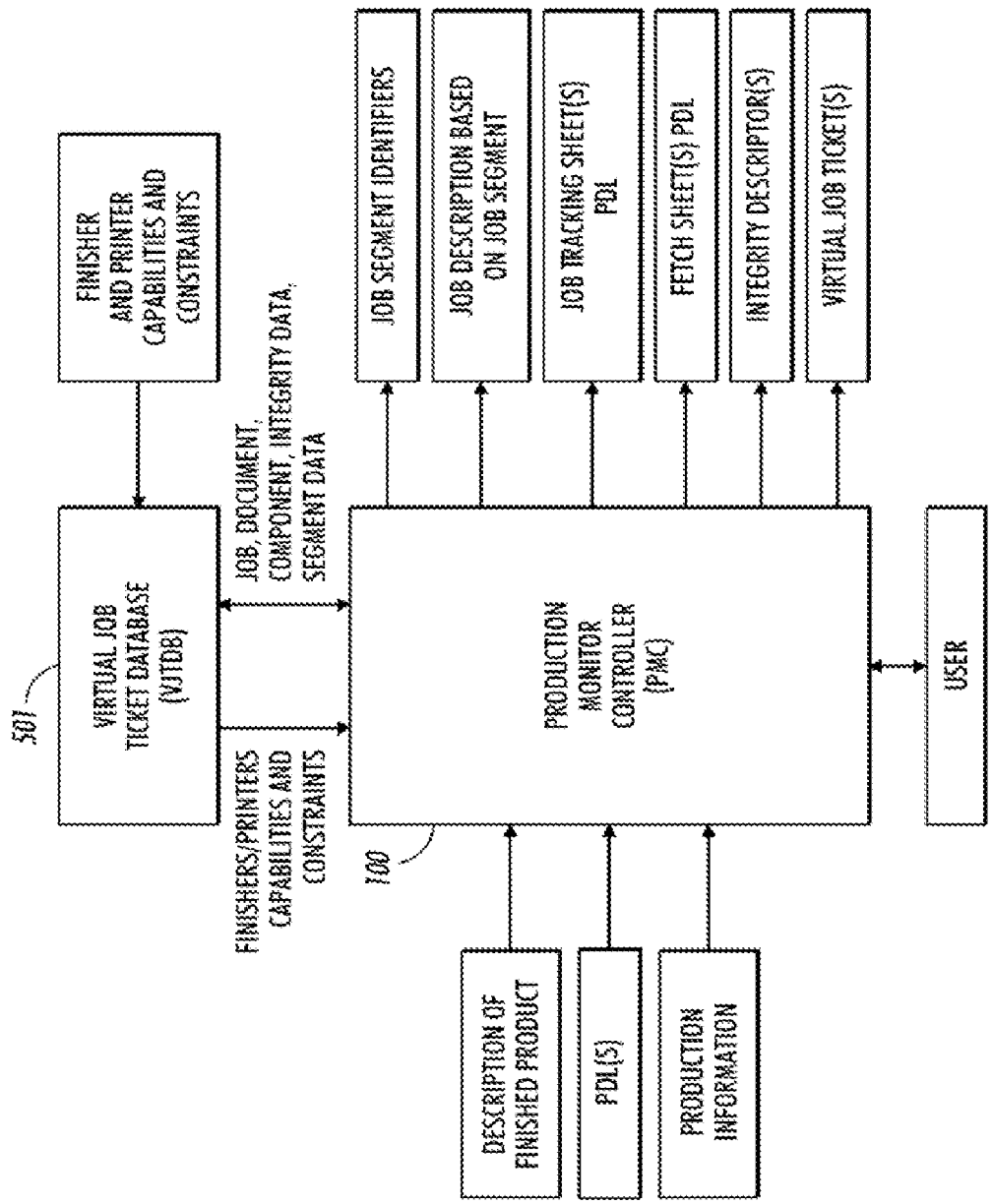
FIG. 2 is a block diagram emphasizing selected aspects of the workflow of FIG. 1, including the PMC with various inputs and outputs, such as a virtual job ticket database (VJTDB)

FIG. 2 shows some exemplary inputs and outputs of the PMC 100, as well as the relationship between the PMC and a virtual finishing job ticket database (VFJTDB) 501. In general, the inputs to the PMC 100 include some or all of: 1) from the Virtual Printer Job Ticket Database ("VPJTDB"), a list of printer capabilities and constraints; 2) from the VFJTDB, a list of assembler/finisher capabilities and constraints; 3) a description of the finished product which may be a CIP3 or similar description; 4) PDLs and other files for the content of each sheet to be printed; 5) production information such as the number of copies, targeted printing devices, and any special finishing or packaging attributes, including, without limitation, the identity and retrieval location of any non-printed and/or inventory items. In general, the output from the PMC includes identification of each job segment for each operation within the job as well as a set printing and assembling/finishing instructions for each job segment. More specifically, the output from a PMC comprises some or all of: 1) a job segment description and identifier(s) for each job segment; 2) a database representation (such as the VJTDB description explained below) of the structure of the job segments and the document components, sheets or sets within the job segment; 3) a PDL file for a job tracking sheet, if any; 4) a PDL for a fetch sheet, if any; 5) integrity descriptors encoded into the VFJTDB for later use by a Finishing Module Coordinator (FMC); 6) virtual job tickets for printers and Assembler/finishers; and 7) a prompt to call for one or more human operator responses.

Referring again to FIG. 1, the instruction set for printing and assembling/finishing is output from PMC 100 in the form of both a Virtual Print Job Ticket (VPJT), 101, and a Virtual Finishing Job Ticket (VFJT), 102. The VFJT and VPJT may contain the complete instruction set for the job or may simply contain reference pointers to a database where such information is retained. The VPJT 101 is conventional in the art as discussed in relation to U.S. Pat. Nos. 5,995,721 to Rourke et al., 5,615,015 to Krist et al., and 5,760,775 issued to Sklot.

The data for each VFJT is recorded by the PMC in the VFJTDB shown in FIG. 1 as 501. In one example, the VFJTDB is a database or a data file that contains all job construction, control and integrity data necessary to take the prints coming from the printing device(s) and perform the necessary finishing processes to turn the prints into the desired final output form. The format of the VFJTDB can be hard copy (print), soft copy (floppy, CD-R, CR-RW) or electronic (electronically stored in memory or on a hard disk drive) copy form. The format may be one or both of human and machine-readable.

The type of data and instructions required in a VFJTDB 501 for each job are information such as but not limited to: accounting and administration information, sheet, set and job level finishing instructions, color and print quality control data, registration data, etc. The data and instructions also contain a description of the job segments (stacks and stacks of sets) of the job being produced and instructions on how to reassemble these pieces to complete the processing of the job. Additionally this information can enable the automatic setup of the finishing device(s), integrity control and monitoring throughout the full scope of the production processes. The VFTDB provides the basis for a direct link between the offline finishing operations and the integrity control functions of online printing and intermediate finishing systems. The VFJTDB data can take on the form of a proprietary format or an industry standard format such as but not limited to a modified form of CIP3.

Referring still to FIG. 1, the printing process may be commenced after delivery of the VPJT, 101, to one or more Digital Front End Print Controllers (DFE) represented by box 200. Such DFE's are conventional in the art. Examples include PDL products made by Splash, Harlequin, Adobe, and others. In conformance with instructions provided in the VPJT, 101, the print job is divided into separate printing job segments and is distributed to various print engines for printing using the printer or press which the operator or PMC, 100, believed to be optimal when the VPJT was first established. Alternatively, the VPJT may provide that the DFE, 200, sometimes through interaction with the PMC, 100, may automatically select the appropriate printing device based upon dynamic queue and print selection criteria.

Boxes 201-204 of FIG. 1 are examples of various types of printers to which document components may be delivered for printing. Printer 201 may be a cut sheet digital printer connected to an integrated finishing module 201A. Integration between printer 201 and finisher module 201A is accomplished using DFA or MFFA-type protocols. As discussed above, a typical finisher module 201A includes capabilities such as collation, folding, and simple binding such as stapling. Printer 202 may be a cut sheet printer with a combination of color and monochrome printing capability. The Document Centre® Color Series 50 printer sold by Xerox Corporation is such a printer. Finisher module 202A is integrated with printer 202 as shown in FIG. 1 and may have capabilities similar to those described in connection with finisher 201A. Similarly, printer 203 is shown as a continuous form feed printer and is integrated with finisher module 203A. Printer 204 represents the various apparatus and processes normally associated with offset printing, including the prepress steps of preparing offset plates at a plate imager 204A, plate developer processor 204B, and offset printing press 204C. Unlike printers 201-203, which may be digitally integrated with their respective intermediate finishing modules 201A-203A, offset presses are not digital imaging devices and lack direct digital integration with assembly and finishing equipment.

As shown in FIG. 1, each of finishing modules 201A-203A and offset press 204C place their respective job segments in their respective output trays or bins 201B-203B and 204D. When placed in such trays or bins, the job segments or may not be collated, stacked or otherwise separated for handling and conveyance. Also each of finishing modules 201A-203A may provide some intermediate level of finishing, such as folding or stapling. Multiple document components may be printed or assembled at the same printer and intermediate finishing station and be treated during this phase of the job as one job segment. Conversely, a single large document component may be output in a stack with separator sheets or offset stacks indicating multiple job segments within the single document component.

Figure 3:
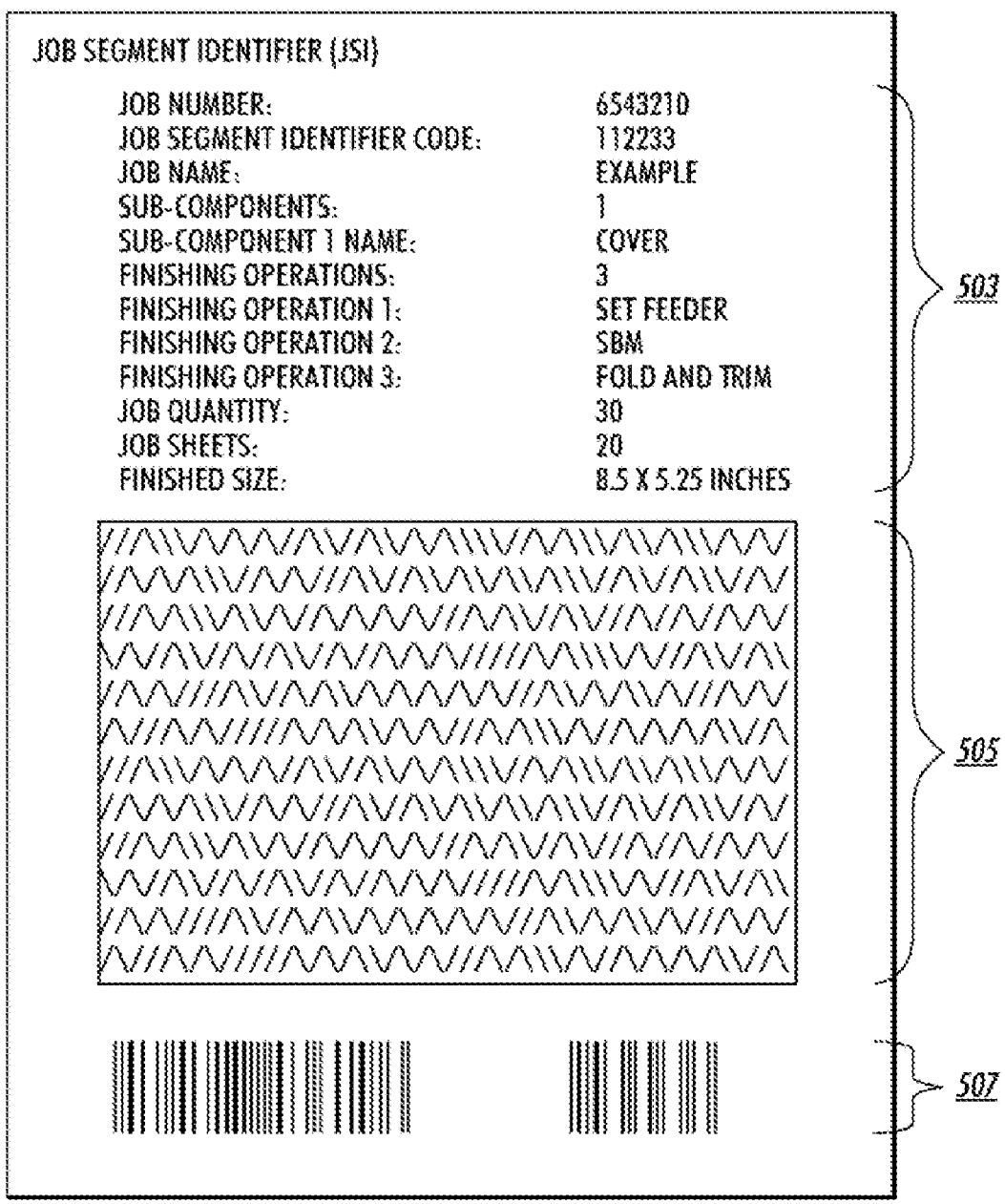
FIG. 3 is a planar view of a job segment identifier sheet.

Referring to FIGS. 1 and 3, another aspect of the disclosed embodiments is the association of a unique Job Segment Identifier (JSI) with each job segment. In FIG. 1, a sheet containing a JSI is shown in association with each job segment that is output from printers 201-204. The respective JSI sheets are labeled 201C-203C and 204E, respectively. For complex jobs or for document components that are printed in large stacks, there may be many JSIs corresponding to many job segments within the job or within the stacks.

A JSI can assume any form that can be associated with a job segment throughout the finishing and other applicable printing processes. Among such forms are copies stored in (a) a printed sheet printed and placed on top of a printed job segment, (b) system memory such as hard drives, (c) magnetic media such as floppy disks or magnetic strips, (d) optical memory such as CD-ROM or CR-RW disks, (e) bar code symbols printed on sheets associated with the Job Segment, or (f) any other means by which machine or human readable identifying information may be associated with a Job Segment. A JSI may be machine, human readable, or both depending upon the phase of the job. Indeed, in the event that a scanner is capable of reading the top printed page of a job segment in such manner that the job segment can be uniquely identified, then no special symbols or special top page would be necessary. Thus, each JSI contains, as a minimum, a job and job segment number or other identifier that uniquely identifies the job segment from all other job segments. Typically, the JSI comprises both a unique job number and a Job Segment Identifier Code (JSIC). The job number uniquely identifies the print job from all other print jobs and the JSIC uniquely identifies the job segment. In one embodiment, the JSIC comprises recognizable unique text on the top sheet of a job segment, which JSIC forms a vector to a JSI that remains encoded in digital memory. Whichever form a JSI takes, the JSI serves as a reference pointer to the portion of the VFJTDB that describes the contents of the identified job segment. The JSI remains associated with the applicable job segment when it is transported from the printing device(s) to other finishing processes. This enables tracking of the job segment from the printing device(s) to the assembler/finisher apparatus. Whether or not the job segments are part of a job that requires prints to be produced on one or more printing device(s), each JSI will have a common job number but a different JSIC that uniquely identifies each particular job segment of the job.

In FIG. 1, the JSIs are shown in the form of a printed sheet called a Job Segment Identifier Sheet (JSIS) that is typically printed along with the sheets of the job and is placed on top of the job segment stack in the output trays or bins, 201B-203B and 204D. Such JSIS sheets are shown in FIG. 1 as 201C-203C and 204E. Information on a JSIS comprises either (a) a pointer (the job number and JSIC) to VFJTDB stored in some other electronic or soft copy format or (b) the portion of the VFJTDB itself that provides instructions for the job. Such instructions may be printed on the JSIS in electronic or human readable form. In contrast to conventional separator sheets that are placed upon each stack of printed output no matter how large the stack, each JSI serves as a unique identifier of each job segment of a print job.

Referring to FIG. 3, an example of a JSIS is shown. Human readable text comprising the JSI and job instructions is shown at region 503. In region 505, machine readable glyphs are shown containing the full data content of the VFJTDB applicable to the identified job segment. In region 507, a machine readable bar code is shown which comprises a pointer to the VFJTDB stored elsewhere.

In the final assembly and finishing phase, the various document components are gathered from output trays or bins 201B-203B and 204D, assembled in a particular order, and finished into a specified document form. In FIG. 1. arrows 301 and 302A, B, and C show the conveyance of printed job segments from output trays or bins 201B-203B and 204D to finishing Set Feeder Module 402 and Sheet Feeder Module 401, respectively.

As contemplated by the disclosed embodiments, each job segment arrives at the assembler/finisher apparatus with a JSI reference pointer. As noted above, this typically will appear on a JSIS although any form of JSI will suffice. The purpose of the JSI is to identify a particular job segment to a Finishing Module Coordinator (FMC) 509, which is a controller suitable for directing the assembler/finisher operations. In FIG. 1, a Virtual Finishing Job Ticket Reader (VFJTR) is shown as 511 and is responsible for reading the JSIS or for otherwise providing information to the FMC, 509, sufficient for the FMC to determine the unique JSIC. Humans may also intervene in the process to submit JSICs to the FMC, particularly if a JSIS is only human readable. The FMC, 509, is a software-based controller that manages, interprets, sequences, and allocates assembler/finisher production data. Using a variety of interfaces to each assembler/finisher device, the FMC communicates to each device the data required to program that device for implementation of the job. It tracks each job segment through the process and ensures that job segments are properly loaded before the devices begin operating.

The FMC also typically provides information to human operators concerning job status and in order to enable operators to make production decisions where necessary or appropriate. The FMC operates by receiving the JSI that identifies each job segment and determining whether the JSI itself contains all required assembler/finisher data. If a JSIS or similar JSI does not provide all instructions for finishing the job, then the FMC uses the JSIC to retrieve all relevant information concerning the job model stored in the VFJTDB. The FMC then reviews the assembler/finisher combinations prepared by the PMC to ensure that all identified devices are currently available. Once this condition is satisfied, then the FMC determines the bins or other assembler/finishing locations where each job segment should be placed. In general, the FMC communicates with the PMC through the VFJTDB. Where assembler/finisher devices are automatically programmable, the FMC may be programmed to interact with the specified interface format for each device in order to automatically provide programming instructions. Job tracking and integrity information would also be provided. When all required job segments have been loaded in their appropriate bins, the FMC would either direct the assembler/finisher devices to begin or would inform human operators that the job is ready. In this manner, the complete assembler/finisher operation can be controlled, implemented, tracked, and checked for integrity.

Further detailed description regarding structure and operation associated with FIGS. 1-3 is provided in U.S. Pat. No. 7,092,963 B2 to Ryan et al., the pertinent portions of which are incorporated herein by reference.

Figure 4:
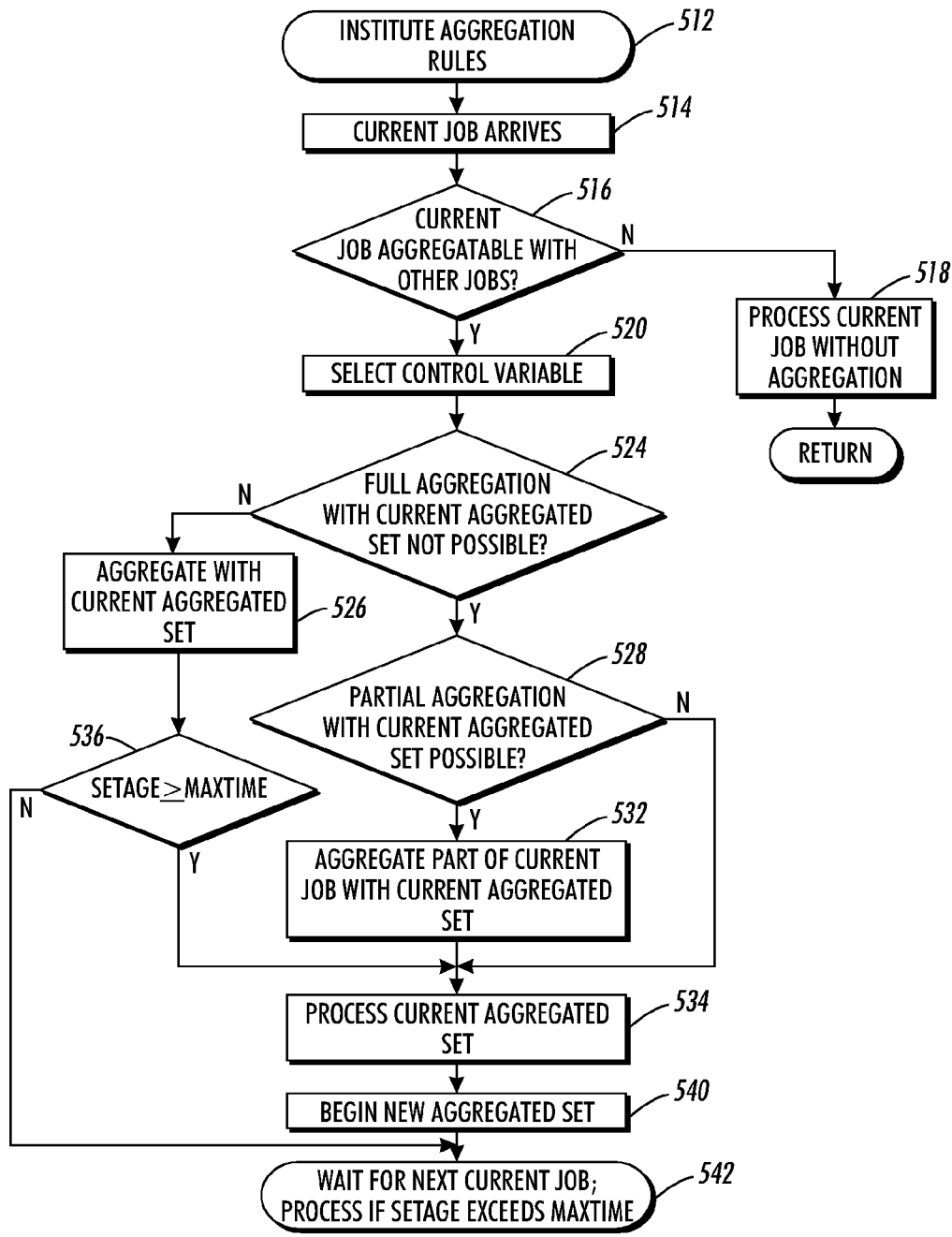
FIG. 4 is a flowchart illustrating a computer implemented approach for aggregating print jobs.

Referring to FIG. 4, an exemplary computer implemented approach for both generating and managing an aggregated print job set or print job group is described. Initially, at 512, a set of aggregation rules is provided. While letter size, may be used as one criteria for aggregation, there are many criteria that will appear to those skilled in the art, including media type (size, weight, or color), printing system color, gloss, grain, opacity, desired image quality, just to name a few. As each job arrives (514), the current job may be assessed (516) to determine if it is aggregatable (i.e., beneficially combinable) with other stored jobs. Each non-aggregatable job is processed in a normal course (518), while, at 520, a control variable for aggregation is selected. One control variable might include job size. As can be appreciated by those skilled in the art, "job size" can be defined in several contexts. For instance, job size could refer to a "quantity of sets," or "a first quantity of pages per set multiplied by a second quantity of sets," just to name a few. Other control variables, such as job age, are contemplated by the disclosed embodiments. A plurality of control variables may be applied.

Figure 5:
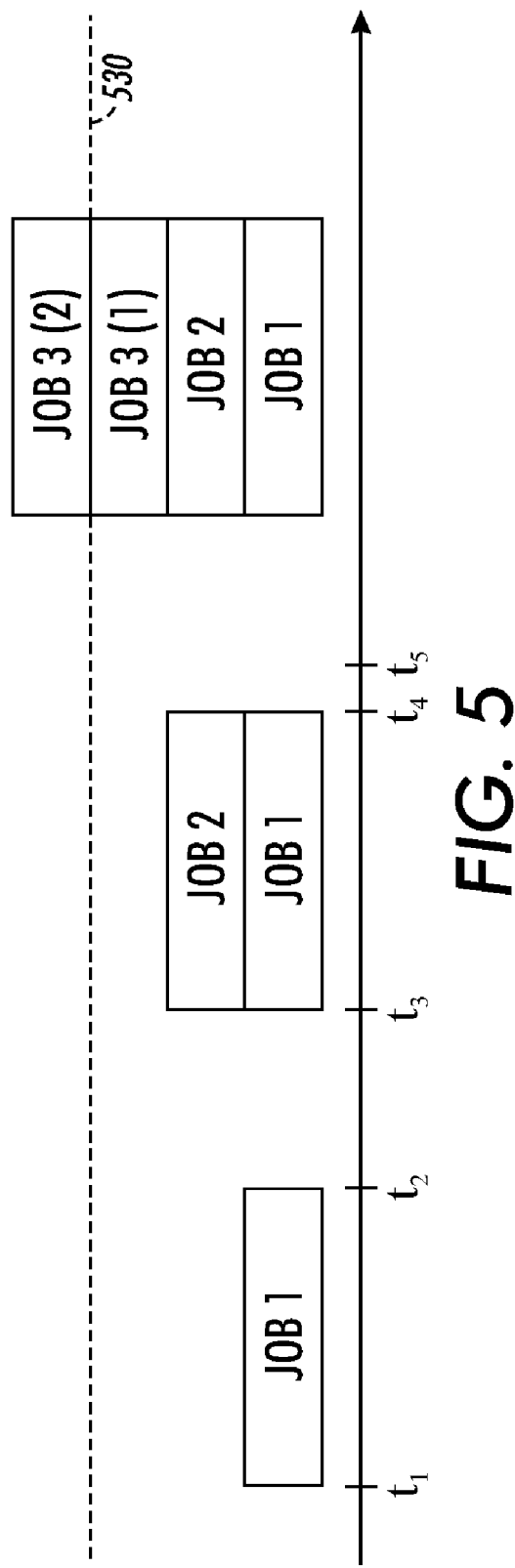
FIG. 5 a schematic diagram illustrating how three jobs might be combined over time.

At 524, a determination as to whether all of the current job can be aggregated with a combination of stored jobs is made. If the entire current job is aggregatable, then the aggregation of 526 is performed; otherwise, at 528, a second level determination, regarding partial aggregation, is made. Referring briefly to FIG. 5, a concept of full or partial aggregation is described. As shown, Job 2 can be completely aggregated with Job 1 because a combination of the two jobs does not exceed a given threshold 530. In a first example, the threshold 530 corresponds with an output constraint, such as the page capacity or size of an output device (such as an output stacker or finishing device). As can be appreciated by those skilled in the art, output constraints can correspond to physical constraints or characteristics of the hardware devices used in production or they may correspond to less tangible concepts such as shop policies. For instance, the threshold 530 could be varied to reflect a job or container limit. Additionally, each of Job 1 and Job 2 can be placed in n-up format so that the number of printable pages for each job can be reduced considerably. In one approach, letter size pages are imposed electronically on 11×17 media, and, pursuant to finishing, cut and stack operations can be performed to return the aggregate job to its original intended components.

In one example, Job 3 (a combination of Job 3(1) and Job 3(2)) cannot be completely aggregated with the current aggregate job (including Jobs 1 and 2) because the combination of Jobs 1, 2 and 3 exceed the threshold 530. In this event, Job 3 can either be excluded from the current aggregate job, and the current aggregate job processed by the system, or a part of Job 3 (Job 3(1) in the example of FIG. 5) can be aggregated with the current aggregate job or set (532 of FIG. 4) and a current aggregated set of Job 1, Job 2 and Job 3(1) can be processed (534). It should be appreciated that Job 3 is most easily divided along set boundaries (if they exist) and that, in the absence of a convenient boundary along which to divide Job 3, it might be undesirable to aggregate even part of Job 3 with Jobs 1 and 2. In the event that aggregation of partial Job 3 is undesirable, Jobs 1 and 2 are simply processed without any of Job 3.

As contemplated, permitting a given aggregate job to exceed a select age is undesirable. Consequently, referring to FIG. 4, when a maximum storage age ("Maxtime") of an aggregate job or set exceeds the storage age ("Setage") of the aggregated set (536), then the current aggregate job is processed (via 534). Referring again to FIG. 5, the exemplary approach of processing an aggregate job on the basis of age can be further understood. In particular, after aggregating the jobs at $t_4$, a check (536 of FIG. 4) may be performed at $t_5$. Assuming $t_5$ is greater than Maxtime, then the aggregate of Jobs 1 and 2 is processed via 534.

Referring now to FIGS. 4 and 5, for the example in which Job 3(1) is combined with Jobs 1 and 2, a new aggregation set (including Job 3(2)) is begun at 540. Then the system waits (542) for the next job to determine, by way of 516, whether it can be aggregated with Job 3(2). Referring still to 542, for those instances in which aggregate jobs are not permitted to age past a given Maxtime, the check of 536 is performed periodically for the current aggregate set.

Figure 6:
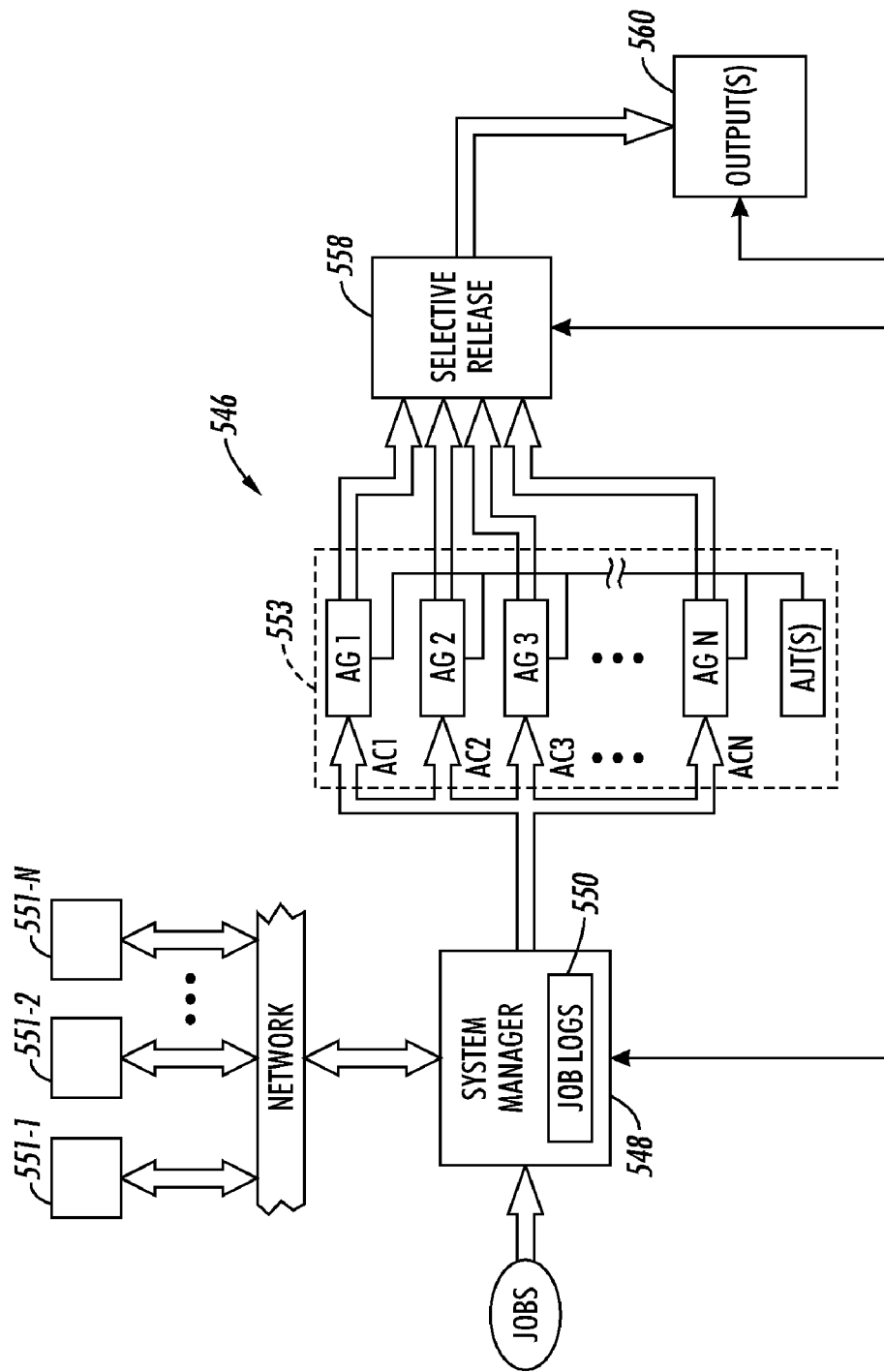
FIG. 6 is a block diagram of a print job aggregation workflow employing some of the components of FIGS. 1 and 2.

Referring now to FIG. 6, a print job aggregation workflow 546, employing some of the components of FIGS. 1 and 2, is shown. With the print job aggregation workflow of FIG. 6, print jobs can be sorted into proposed aggregation groups, and then tracked along the workflow. As shown in the example of FIG. 6, jobs are received at a system manager 548. As contemplated, the system 548 may comprise any suitable computing platform including suitable amounts of memory and processing capability. In one example, the system manager includes a memory section, designated by the numeral 550 and labeled "Jobs Log," for maintaining tracking information about jobs handled by the print job aggregation workflow. Additionally, the system manager communicates with several clients 551-1 through 551-N by way of a suitable local or wide area network (which may include, at least in part, the world wide web) 552. A communication network suitable for use with the workflow 546 is disclosed in U.S. Pat. No. 5,220,674 to Morgan et al., the pertinent portions of which are incorporated by reference. As can be appreciated by those skilled in the art, network clients could be apprised of the processing status of jobs via conventional print protocols, as well as through general purpose web protocols.

Finally, the system manager 548 communicates with a memory section 553 for storing one or more print job aggregation groups (AG 1, AG 2, AG 3, . . . , AG N), as well as one or more aggregation job tickets (AJT(s)). It should be appreciated that each one of the aggregation groups corresponds with one or more print jobs and that each of the one or more print jobs may correspond with one or more aggregation criteria (AC). AC might be based on one of several criteria including, among other things, media type (size, weight, or color), bindery or finishing intent, printing system color, gloss, grain, opacity, desired image quality, just to name a few. While the aggregation groups are shown as discrete entities, discrete separation of the groups is unnecessary. For instance, all of the print jobs in memory section 553 could be stored in the order in which they were received and separation could be achieved virtually with each print job having a pointer to a given AC or AG.

Figure 7:
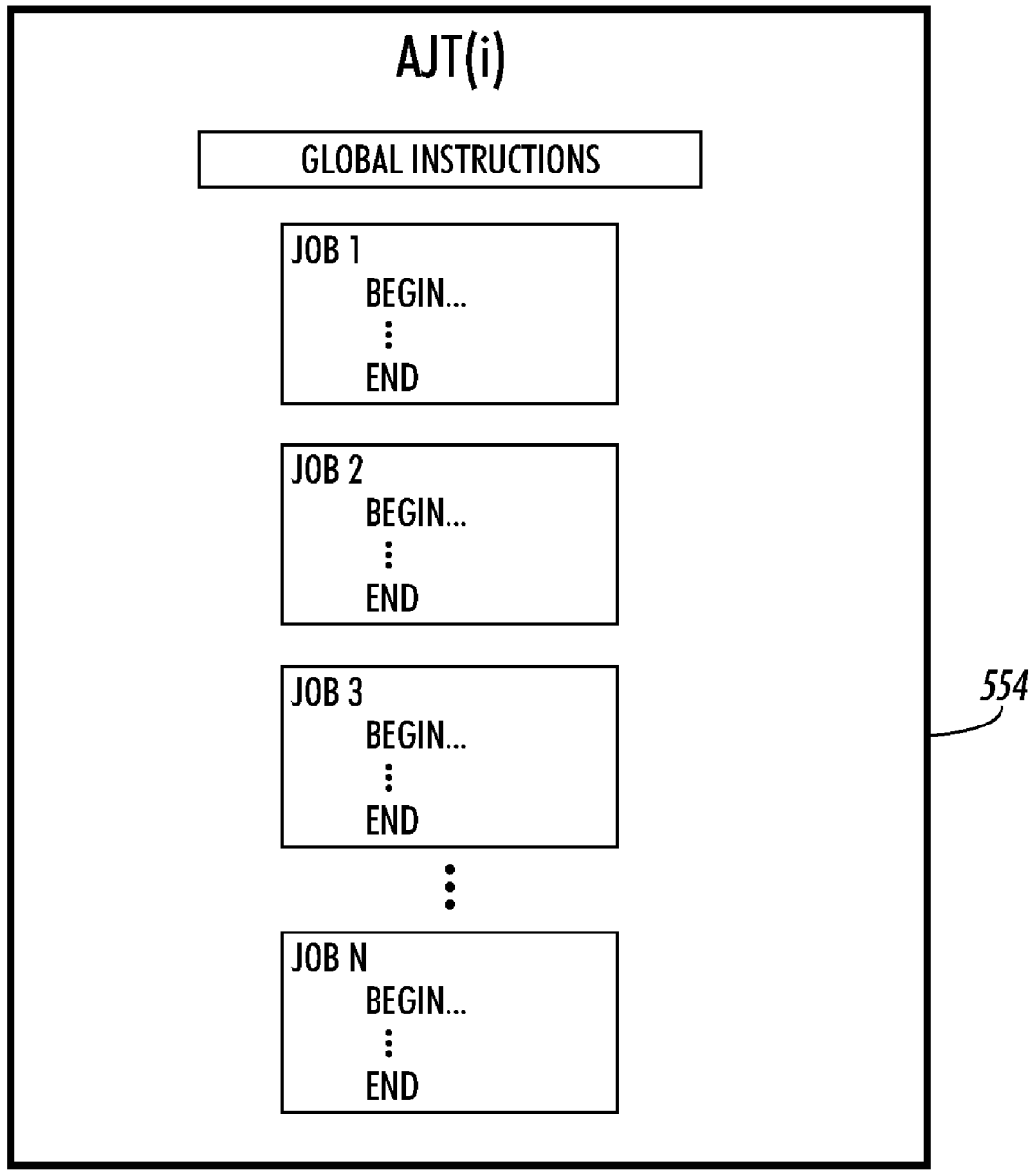
FIG. 7 is a planar view of an aggregation job ticket intended for employment with the print job aggregation workflow of FIG. 6.

The exemplary workflow of FIG. 6 takes advantage of one or more AJTs to facilitate flow of the jobs through the system. As contemplated, an AJT could be provided for each AG, or the AJTs for all of the AGs could be combined into one. Referring to FIG. 7, an exemplary AJT for a single AG (AJT (i) 554) is shown. In the example of FIG. 7, a set of global instructions (relating, for example, to media characteristics, print quantity and/or set-up requirements) is used to control the instruction sets for N print jobs. As shown, each print job instruction set is discreet, with appropriate beginning and end instructions. Further information regarding job tickets is provided in U.S. Pat. No. 5,493,634 to Bonk et al, the pertinent portions of which are incorporated herein by reference.

Referring again to FIG. 6, a selective release 558, controlled by the system manager, permits a given AG to be sent to one or more outputs 560 when a selected release condition, or one of several criteria, is met. In practice, the selective release includes a list of release conditions or criteria. For instance, an AG might be released when either its page count or print quantity reaches a selected threshold. Other release conditions, such as AG age, are contemplated by the disclosed embodiments. In one example, the selective release comprises one or more instructions which operate in conjunction with the system manager 548 for causing one of the AGs to be transmitted to the outputs 560.

Figure 8:
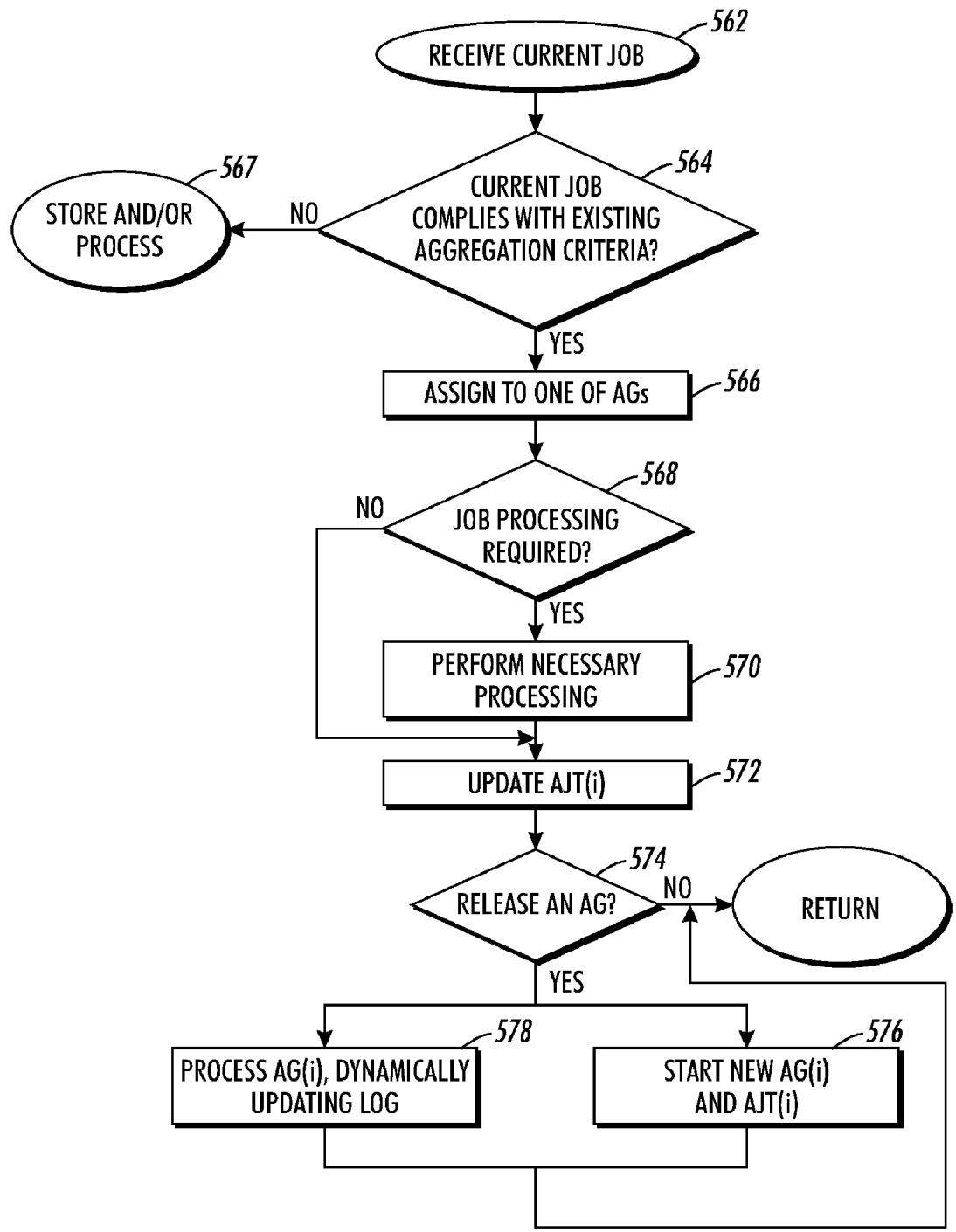
FIG. 8 is a flowchart illustrating another computer-implemented approach for aggregating print jobs.

The operability of the print job aggregation workflow 546 can be more fully comprehended by reference to the flowchart of FIG. 8 and the following discussion: (1) The workflow examines each incoming print job (562), and each print job complying with a predefined AC (positive answer at 564) is assigned to one of multiple AGs (566). For example, JDF jobs may be sorted by media, media size, and binding intent. The AC may be associated with the cost required to change a production setup requirement (i.e., a setup requirement associated with either a print job or print related device) to produce a different output, e.g., for continuous feed printers, loading a new media (new paper web) is costly because of lost machine productivity during the changeover as well as the labor cost to thread the new media. Other setup requirements might include providing forms and/or inserts for use in processing a job, as well as a setup adjustment for a finishing/binding related resource.

(2) Once AGs have been defined and jobs start collecting, the system will evaluate configuration rules to determine how jobs should be aggregated and when they might require further processing. Depending on the shop defined aggregation criteria, the system may have multiple levels of aggregation files.

Referring to 568 and 570 of FIG. 8, the workflow might have general aggregation processing rules for use with jobs to be assigned to the AGs. For instance, when printing a series of contiguous duplex jobs, each one of certain new duplex jobs should begin on an odd (recto) output page in order to prevent printing of the first page of one job on the back page of another job.

Referring still to 568 and 570, the workflow 546 might have aggregation rules that are applied on an AG by AG basis. For example, the system might add blank pages (pad) jobs to prevent one imposed document from interfering with another imposed document. For instance, if an imposition layout uses four pages per sheet, the workflow might add pages to ensure that the page count is a multiple of four. This rule would apply to, for example, aggregated booklets where pages might be added to ensure that the first page of one booklet does not start printing on the last sheet of the previous booklet.

(3) The workflow might also aggregate jobs for packaging/management purposes. For instance, the workflow might aggregate PDF jobs into a variable information container to allow efficient placement of PDL jobs that share common resources. This could be useful to, for example, mimic "Come and Go imposition" in automated prepress systems that do not support sophisticated imposition.

(4) As mentioned above, the workflow might create an AJT (572) whose main purpose would be to retain the discreet nature of all the jobs that are aggregated together. This ticket, in one approach, would be associated with an AG (572) and would be used as a holder for all the job ticket information on the aggregated jobs. It follows that a given AJT would be updated each time a given job is added to a corresponding AG. JDF tickets comprehend job parts and the concepts underlying the development and use of such JDF tickets could be used to represent the job ticket information of discrete jobs.

(5) The workflow 546 may be configured with criteria (574) for determining when aggregation should complete and production of one or more AGs should commence. This may be configured based on a number of criteria. Some envisioned examples include (a) number of aggregated jobs, (b) number of pages in an aggregated document, (c) when a predefined marker is found on an input job, (d) when the oldest job in a given AG reaches a certain age.

Elaborating on (5), in one example, if the page count of a given AG exceeds the capacity of a given output device, the system will proceed to process all but the last job in the aggregation group. A part of the last job (possibly one or more job sets defined by set boundaries) may be processed with all but the last job. Referring to 576, the last job, or part of the last job, may then become the first job of the next aggregation set. Other potential variables for aggregation could include print quantity. This could be used in a couple of different ways. For instance, thresholds for aggregating could be set at less than n sets. Also, an incoming job could be aggregated with an existing AG and a determination could be made as to whether the job fits as a part of the existing AG or constitutes the start of a new AG. If the job does not fit the system might start a new AG but keep the old AG open for additional jobs. Jobs would then be fit into an AG by looking at the oldest AG(s) first and only looking at a further AG(s) if the job does not fit in the oldest AG. As contemplated by the disclosed embodiments, a given AG would only be stored for a selected time interval—after the selected time interval, the given aggregated AG would be transmitted to the output(s) 560 (FIG. 6) for processing. As is also contemplated by the disclosed embodiments, time values (such as the end of a second of two shifts) or setbacks from production relevant time events (such as a courier pickup time) can also be used to trigger the transmission of an aggregated AG to the output(s) 560.

(6) As production starts, the workflow may perform the defined prepress and press operations on the jobs of a given AG. Since the system keeps track of what portions of each AG belong to specific input jobs, the system will update Job Logs (e.g., JDF AuditPools) while hiding the fact, from typical system consumers, that the print jobs were aggregated.

The workflow 546 is capable of notifying upstream components as if the jobs were being processed independently, thus enabling accurate tracking of each job's progress to systems that are unaware of the production aggregation.

In the event the workflow needs to submit jobs to downstream components (e.g. JDF-enabled offline finishing devices), the system is capable of extracting information about specific jobs from the AJT, and submitting such information to an appropriate destination, thus enabling post-print disjointing of jobs. This would enable discreet jobs to be further processed without impairing the progress or status of the corresponding AG.

Various features of the above-described embodiments should now be apparent. The following features relate to a first aspect of the disclosed embodiments:

A print job is received and may be stored in memory prior to aggregating at least a part of the received print job with one of a first print job group and a second print job group.

The received print job may include a first part and a second part, and the at least part of the received print job may correspond with the first part of the received print job. In turn, the second part of the received print job may be stored along with a fourth print job, the fourth print job being part of a third print job group.

The received print job may correspond with a first page size value and the first print job group may correspond with a second page size value. Accordingly, the at least part of the received print job and the first print job group may be aggregated when a sum of the first page size value and the second page size value exceeds a selected threshold.

The first print job group and the second print job group respectively comply with a first set of print job aggregation criteria and a second set of print job aggregation criteria. In one example at least one of the first set of print job aggregation criteria and the second set of print job aggregation criteria is configured to include a production setup requirement. The configuring may include designating the production setup requirement as a print media related setup requirement. Alternatively, the configuring may include designating the production setup requirement as a finishing or binding related setup requirement.

The first aggregated print job set may include at least two contiguous duplex documents with each one of the at least two contiguous duplex documents including a first page and a back page. Additionally, each one of the at least two contiguous duplex documents may include one or more odd (recto) pages. Accordingly, printing may begin on at least one of the odd (recto) pages of the at least two contiguous duplex documents so as to prevent printing of the first page of one of the at least two contiguous duplex documents on the back page of another one of the at least two contiguous duplex documents.

The first aggregated print job set may include a first booklet with a plurality of sheets followed by a second booklet with a plurality of sheets and a first page. At least one page may be added to a last sheet of the first booklet so that a first sheet of the second booklet is printed separately from a last sheet of the first booklet.

Each one of the first aggregated print job set and the second aggregated print job set includes processing related instructions for each print job (or portion thereof). In one example, at least one job ticket is provided with processing related instructions, and, pursuant to transmitting one or both of the first and second aggregated print job sets to the document processing resources, the processing related instructions are communicated to the document processing resources with the at least one job ticket. In another example, the job ticket information for each one of the first and second aggregated print job sets may be provided by way of a composite job ticket including both the first and second job tickets.

A log is maintained for indicating a processing status of each print job (or portion thereof) in each one of the first and second aggregated print job sets. The log can be used to apprise a network client of an extent to which each print job (or portion thereof) in one or both of the first and second aggregated print job sets has been processed.

The following features relate to a second aspect of the disclosed embodiments:

The first aggregated print job set is formed pursuant to a first selected condition and the second aggregated print job is formed pursuant to a second selected condition.

In one example, the first selected condition is different from the second selected condition.

In another example, at least one of the first selected condition and the second selected condition is defined with a page size or page count limit.

In yet another example, at least one of the first selected condition and the second selected condition is defined with a job age limit.

It should now be apparent that the above-described result provides a desirable approach in which original jobs are visible as entries in a workflow, even when grouped for processing, and in which jobs are grouped in such a way for aggregation that processing of the same is facilitated. Additionally, the following benefits can be fully appreciated:

Automated aggregation of heterogeneous input can improve machine productivity in document production settings. Improving machine productivity can lower effective print costs by spreading out fixed device costs over more print volume.

Shop-configurable sorting and aggregation rules allow a production facility to determine the best way to produce similar jobs without losing the context of the original job and without requiring upstream and downstream systems to understand production-mandated aggregation.

The use of aggregation to mimic sophisticated prepress functions allows print shops to leverage the simpler automated functionality in some complex scenarios The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer implemented method of automatically aggregating multiple print jobs, comprising:
   (A) storing a first print job group of one or more print jobs in memory, the one or more print jobs of the first print job group complying with a first set of print job aggregation criteria;
   (B) storing a second print job group of one or more print jobs in memory, the one or more print jobs of the second print job group complying with a second set of print job aggregation criteria;
   (C) receiving a print job;
   (D) aggregating at least a part of the received print job with the first print job group to form a first aggregated print job set if (1) the received print job complies with the first set of print job aggregation criteria and (2) one of a set of release criteria is met;
   (E) aggregating at least a part of the received print job with the second print job group to form a second aggregated print job set if (1) the received print job complies with the second set of print job aggregation criteria and (2) one of a set of release criteria is met;
   (F) transmitting one or both of the first aggregated print job set and the second aggregated print job set to one or more document processing resources for processing;
   (G) apprising a network client, with a system manager, of when one of the first, second and third print jobs has been processed with the one or more document processing resources; and
   wherein the first aggregated print job set includes at least two contiguous duplex documents with each one of the at least two contiguous duplex documents including a first page and a back page, and in which each one of the at least two contiguous duplex documents includes one or more odd (recto) pages, further comprising:
   (H) beginning printing on at least one of the odd (recto) pages of the at least two contiguous duplex documents so as to prevent printing of the first page of one of the at least two contiguous duplex documents on the back page of another one of the at least two contiguous duplex documents.

2. The method of claim 1, further comprising: (I) storing the received print job in memory prior to performing either (E) or (F).

3. The method of claim 1, in which the received print job includes a first part and a second part and in which the at least part of the received print job corresponds with the first part of the received print job, further comprising:
   (I) storing the second part of the received print job for aggregation with a fourth print job, the fourth print job being part of a third print job group.

4. The method of claim 1, in which the received print job corresponds with a first page count value and the first print job group corresponds with a second page count value, wherein said (D) includes aggregating the at least part of the received print job and the first print job group when a sum of the first page count value and the second page count value exceeds a selected threshold.

5. The method of claim 1, further comprising configuring at least one of the first set of print job aggregation criteria and the second set of print job aggregation criteria to include a production setup requirement.

6. The method of claim 5, wherein said configuring includes designating the production setup requirement as a print media related setup requirement.

7. The method of claim 5, wherein said configuring includes designating the production setup requirement as a finishing or binding related setup requirement.

8. The method of claim 1, in which the first aggregated print job set includes a first booklet with a plurality of sheets followed by a second booklet with a plurality of sheets, further comprising:
   (I) adding at least one page to a last sheet of the first booklet so that a first sheet of the second booklet is printed separately from a last sheet of the first booklet.

9. The method of claim 1, further comprising:
   (I) maintaining a log with information for indicating an extent to which each print job (or portion thereof) in the one of the first aggregated print job set and the second aggregated print job set is processed.

10. The method of claim 9, further comprising:
    (I) apprising a network client with information from the log.

* * * * *